United States Patent [19]
Drake, Jr. et al.

[11] Patent Number: 5,706,613
[45] Date of Patent: Jan. 13, 1998

[54] PLAYHOUSE WITH PIVOTALLY ATTACHED SEATS

[75] Inventors: Raymond J. Drake, Jr., East Aurora; Miriam Kelley, Buffalo, both of N.Y.

[73] Assignee: Fisher-Price, Inc., East Aurora, N.Y.

[21] Appl. No.: 516,451

[22] Filed: Aug. 17, 1995

[51] Int. Cl.$^6$ ........................................ E04H 1/12
[52] U.S. Cl. .................. 52/79.1; 403/263; 403/381; 297/142; 446/121; 446/110; 446/482
[58] Field of Search ........................... 446/120, 121, 446/110, 478, 479, 482; 297/14, 142; 52/79.1; 403/263, 381

[56] References Cited

U.S. PATENT DOCUMENTS

| | | |
|---|---|---|
| D. 326,689 | 6/1992 | Farinelli, Jr. . |
| D. 333,328 | 2/1993 | Aker et al. . |
| D. 340,098 | 10/1993 | Petersheim . |
| D. 340,099 | 10/1993 | Warren et al. . |
| D. 344,121 | 2/1994 | Warren . |
| D. 344,770 | 3/1994 | Swiderski . |
| D. 348,988 | 7/1994 | Bro et al. . |
| D. 353,866 | 12/1994 | Houry et al. . |
| D. 353,867 | 12/1994 | Houry et al. . |
| D. 354,108 | 1/1995 | Houry et al. . |
| D. 358,441 | 5/1995 | Houry et al. . |
| D. 370,959 | 6/1996 | Houry . |
| 1,037,010 | 8/1912 | Irons . |
| 1,315,628 | 9/1919 | Gilbert . |
| 1,343,065 | 6/1920 | Suyehiro . |
| 1,613,654 | 1/1927 | Griffith . |
| 1,647,733 | 11/1927 | Keichline . |
| 1,661,003 | 2/1928 | Miller . |
| 1,823,229 | 9/1931 | Balbaud . |
| 1,936,571 | 11/1933 | Bumann ............................. 52/233 |
| 2,099,075 | 11/1937 | Paulson ......................... 446/110 X |
| 2,145,201 | 1/1939 | Raeuber ............................. 297/142 |

(List continued on next page.)

FOREIGN PATENT DOCUMENTS 344966  11/1904  France ........................... 446/478

OTHER PUBLICATIONS

Little Tikes: Toys That Last, 1994, "Evergreen Playhouse", p. 57.
Little Tikes: Toys That Last, 1994, "Country Cottage", p. 59.
Little Tikes: Toys That Last, 1994, "Log Cabin", p. 56.
Little Tikes: Toys That Last, 1994, "Castle", p. 56.
Little Tikes: Toys That Last, 1994, "Activity Garden", p. 4.
Today's Kids Wish Book, 1994, "Play 'N Fold Clubhouse", p. 3.
Today's Kids Wish Book, 1994, "Infant Toddler Playland", p. 4.

(List continued on next page.)

Primary Examiner—Carl D. Friedman
Assistant Examiner—Aimee E. McTigue
Attorney, Agent, or Firm—Morgan, Lewis & Bockius LLP; C. Scott Talbot

[57] ABSTRACT

A walk-in child playhouse having pivotally attached seating surfaces. In one embodiment, the walk-in child playhouse comprises an enclosed rotomolded plastic structure having walls, a roof, and at least one chair or seat member pivotally attached to the playhouse. In another embodiment, the walk-in child playhouse has a garden party theme in which the roof has a canopy portion overhanging the rear of the house. Under the canopy are two chairs or seat members pivotally connected the rear wall and the roof via a pair of continuous bosses, the rear wall also having a substantially horizontally extending table disposed between the chairs and under the canopy. In another embodiment, the playhouse comprises a series of double-walled hollow parts that are interconnected by a unique snap interlock system. In yet another embodiment, the playhouse comprises a lateral connection member for joining various wall panels at a lower portion thereof. The playhouse may also include other features, such as a sink, stove, telephone and inside molded, non-pivotal seat and table surfaces.

15 Claims, 8 Drawing Sheets

U.S. PATENT DOCUMENTS

| | | |
|---|---|---|
| 2,203,397 | 6/1940 | Taylor . |
| 3,182,420 | 5/1965 | Bender ................................. 446/478 |
| 3,226,790 | 1/1966 | Brown . |
| 3,330,609 | 7/1967 | Tippett ................................ 297/142 X |
| 3,416,200 | 12/1968 | Dadonna, Jr. . |
| 3,895,670 | 7/1975 | Bales et al. . |
| 4,021,960 | 5/1977 | Walmer . |
| 4,270,302 | 6/1981 | Dandia . |
| 4,343,117 | 8/1982 | Shemitz . |
| 4,391,350 | 7/1983 | Moriya . |
| 4,685,751 | 8/1987 | Dupree . |
| 4,893,978 | 1/1990 | Frano . |
| 5,222,902 | 6/1993 | Piersch ................................. 446/121 |
| 5,226,275 | 7/1993 | Trahan . |
| 5,265,848 | 11/1993 | Michaud et al. . |
| 5,469,606 | 11/1995 | Hansen . |

OTHER PUBLICATIONS

Toys to Grow On, Summer Preview 1994, "Indoor/Outdoor Activity House", p. 5.

Flexible Flyer, "Cozy Condo Playhouse".

Step Two: A Step Beyond, 1994, "Drive–In Playhouse", p. 22.

Step Two: A Step Beyond, 1994, "Snap–Together Fence", p. 23.

PLAYHOUSE WITH PIVOTALLY ATTACHED SEATS

The present invention relates broadly to a child playhouse apparatus and more specifically, to a walk-in child playhouse having pivotally attached swing-out seats.

BACKGROUND OF THE INVENTION

Playhouses provide much enjoyment for children because they simulate the ownership of a house which can be lived in and because they simulate exclusive possession in that the house may have play furnishings and small scale appurtenances.

A variety of conventional walk-in child playhouses are known in the art. For the most part, these playhouses include four walls, a roof and a hinged doorway for entry into the playhouse, and are constructed of sturdy molded plastic. Many include other features to make them more closely simulate real houses. For example, Little Tikes® Evergreen® Playhouse has a realistic brick-styled chimney, windows with opening shutters, Dutch doors that open to an interior area and a drop-leaf table. Little Tikes® Country Cottage has a pretend sink, swivel faucet, stovetop with clicking knobs, a push-button play phone and four windows, all having opening shutters. Little Tikes® Log Cabin is a playhouse resembling a log cabin having realistic log detailing, shake roof and opening shutters. Little Tikes® Castle is an outdoor play enclosure resembling a castle having a secret crawl-through door behind the fireplace and a swing-door with a latch. The Cozy Condo™ Playhouse manufactured by The Flexible Flyer Company has, in addition to four walls, a roof and a hinged door, a skylight, a porthole, shutters that open and close and an outside fold down table. The Drive-In Playhouse manufactured by Step 2 is a playhouse that doubles as a garage.

The prior art thus includes playhouses having different themes and related features. Most playhouses, however, do not come equipped with chairs or other seating surfaces for children. While some prior art playhouses may be purchased with small-scale plastic chairs, these chairs must be purchased in addition to the playhouse. Moreover, as with all removable parts, these chairs may become separated from the playhouse and misplaced.

It would therefore be advantageous to have a walk-in child playhouse having attached seats or seating surfaces. Further, it would be advantageous to have attached chair or other seating surfaces which pivot from an opened to a closed position, usable as seats in one position, and conveniently forming part of the design and theme of the playhouse in another position.

SUMMARY OF THE INVENTION

The needs identified above are met, and the shortcomings of prior playhouses overcome by the present invention. In one aspect, the present invention comprises a walk-in playhouse for children having a variety of features including a pair of pivotal swing-out seats attached to a wall of the playhouse. The hingedly attached chairs pivot closed to form an attractive wall section of the playhouse and pivot open to provide a place for children to sit and eat or play. In another embodiment, the swing-out chairs surround a semicircular table and when opened, provide a novel garden party chair-and-table area for a playhouse with a garden party theme. In another embodiment, the playhouse comprises a series of double-walled hollow parts that are interconnected by a unique and safe snap interlock system. In yet another embodiment, the playhouse comprises a lateral connection member or threshold for joining various wall panels at a lower portion thereof.

DETAILED DESCRIPTION

Figure 1:
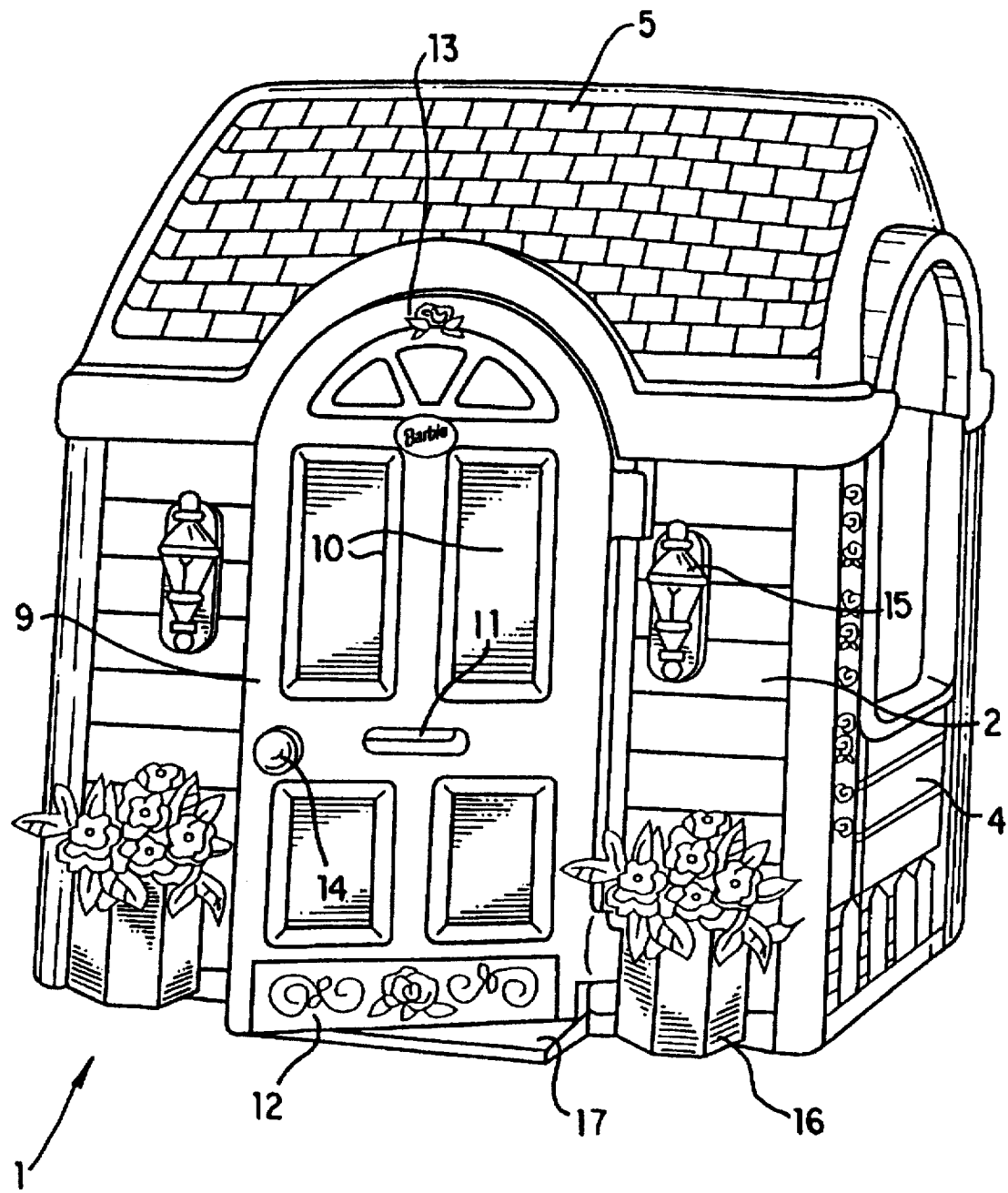
FIG. 1 is a front perspective view of the exterior of the playhouse assembled in accordance with the principles of the preferred embodiment of the present invention.

Reference will now be made in detail to the presently preferred embodiment of the invention, examples of which are illustrated in the accompanying drawings. As depicted in FIGS. 1 through 17, the preferred embodiment of the child playhouse of the present invention is a stand alone, walk-in plastic molded playhouse (1), having a front wall (2) comprised of two wall rectangular wall panels, a rear wall or wall panel (3), two side walls or wall panels (4) and a roof (5) having a domed canopy (6). The preferred embodiment of this invention is a playhouse having a garden party theme characterized by rose (41) and wicker (42) details running throughout the interior and exterior, a pair of swing-out chairs (22) and an attached table top (23) therebetween. Although this playhouse can be disassembled if necessary, it is designed to be permanently assembled by an adult and placed in either an indoor or outdoor location.

As depicted in FIG. 1, the exterior of the front wall (2) preferably includes a door (9), the door having large openings (10) for viewing inside, a mail slot (11), rose detailed kickplates (12) and exterior arch (13) as well as a doorknob (14). On each side of the door on the exterior side of the playhouse are molded lanterns (15). Planter boxes (16) in which a child can place artificial flowers or plant real flowers are also located on each side of the door (9) on the exterior side of the playhouse (1).

The front wall (2) preferably is constructed out of two rotomolded rectangular panels which are connected at a lower end by a transverse, connecting member or threshold (17) and at an upper end by the roof (5). The threshold (17) preferably has a thin linear portion in the center and two planter boxes (16) at each end. The entire threshold (17) is preferably rotomolded. The planter box portions (16) of the threshold (17) attach to the front wall panels with screws on each side via molded through-holes in the panels. The planters may be designed to permit excess water to drain out. When connected, the front wall (3), the threshold (17) and the roof (5) conveniently define a door opening.

The door (9) is also rotomolded and has molded-in bosses at the bottom and top which correspond to a hole in the threshold and to a molded-in hole in the roof's door arch. The door should open at least 90 degrees. The door should also not swing into the house.

The doorknob (14) is preferably blow-molded and is consumer snapped into the door. The knob should freely pivot in both directions.

Figure 2:
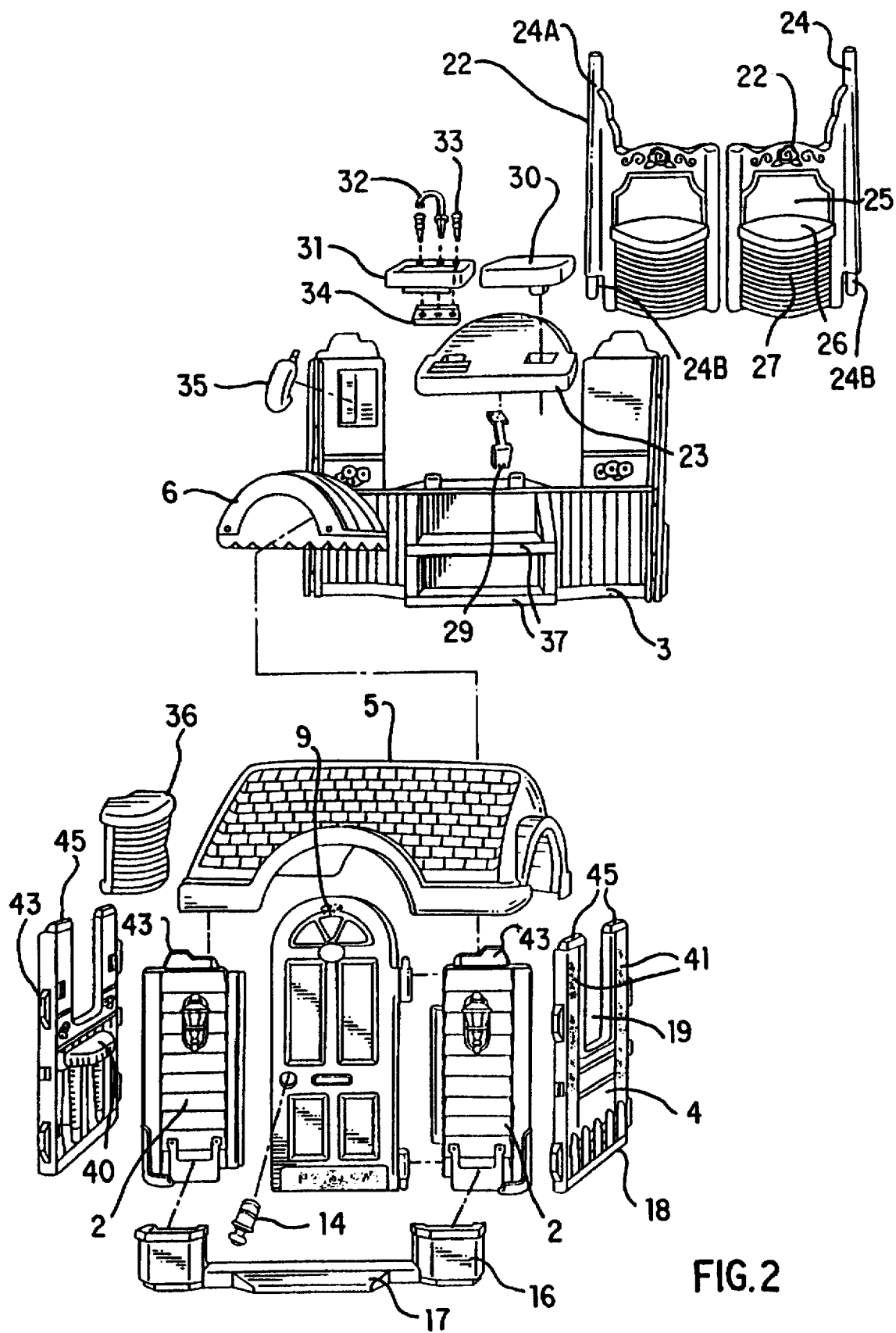
FIG. 2 is an exploded view of the playhouse.

Turning to FIG. 2, the side walls (4) are identical, each having a large window cut-out (19), a picket fence motif running across the bottom (18) and roses on trellises (41) running up next to each side of the window.

All wall panels have tongue (45) on the upper portion thereof that is adapted to fit into a groove (46) on the roof (5). This tongue (45) and groove (46) connection system functions to inhibit lateral movement of the wall panels with respect to the roof, but not vertical displacement. In order to prevent vertical displacement, the tongue and groove connection system on the upper portion of the front wall (2) and the rear wall (3) are preferably fitted with a snap detail or interlock (43).

Figure 15:
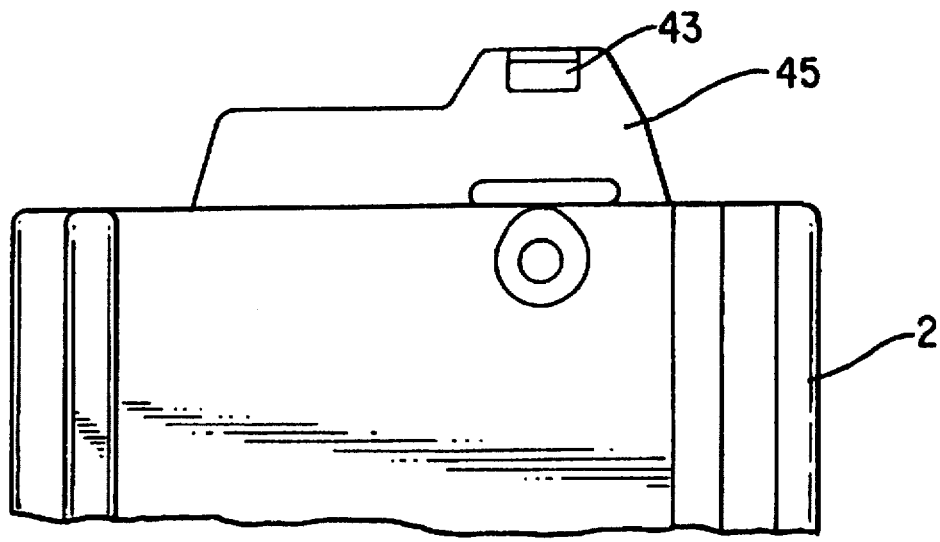
FIG. 15 is a back view (i.e., interior) of the upper portion of a front wall panel.
Figure 16:
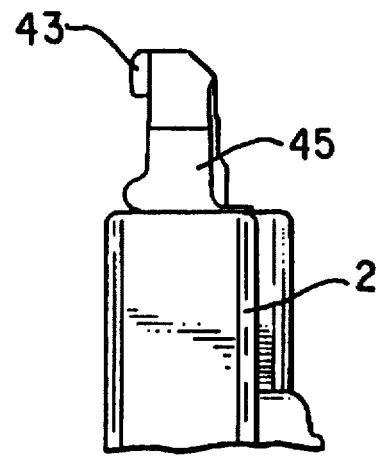
FIG. 16 is a side view of the upper portion of a front wall panel.
Figure 17:
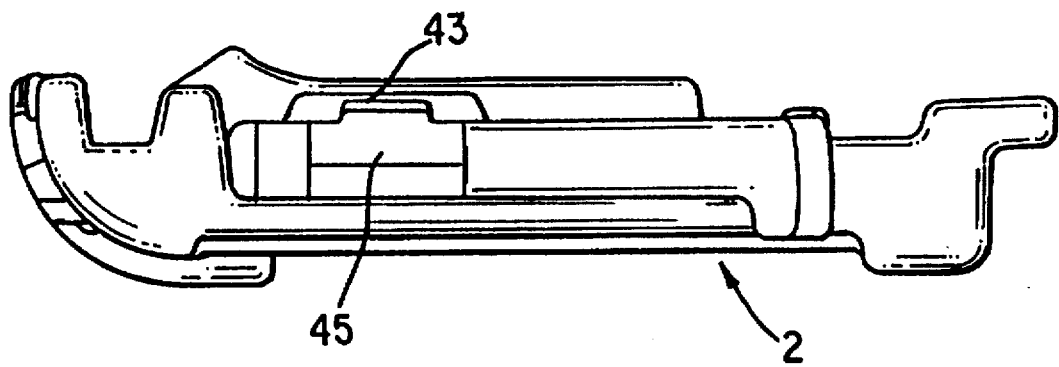
FIG. 17 is a top view of a front wall panel.

As illustrated in FIGS. 15, 16 and 17, the front wall (2) has a tongue (45) on its upper end. The tongue (45) is further fitted with snap detail (43), which consists of a projection having a first portion having a larger width and a second portion having a smaller width. The snap detail (43) is adapted to be inserted into an aperture or hole (44) in the roof (5) to form a secure snap fit interlock.

To accommodate the wall panel tongues (45) and the snap detail (43) on the front (2) and rear (3) walls, the roof (5) contains corresponding grooves (46) and apertures (44), respectively. As seen in cross-sectional view FIG. 14, the groove (46) is a deep recess into which the tongue (45) extends. As seen in cross-sectional view FIG. 13, the aperture (44) is a hole through one wall of the double-walled, hollow roof. When the snap detail (43) is inserted into the aperture (44), the first larger portion (i.e., larger width than the aperture) is pushed all the way through the aperture (44), which flexes and bends to accommodate the larger snap. Once through, the aperture resumes its shape and the second smaller portion of the snap detail extends out through the aperture (44). The snap detail (43), which prevents vertical displacement between the walls (2,3,4) and the roof (5), must be sized such that the first large portion of the snap detail (43) can fit within or inside the hollow double-walled roof.

Figure 9:
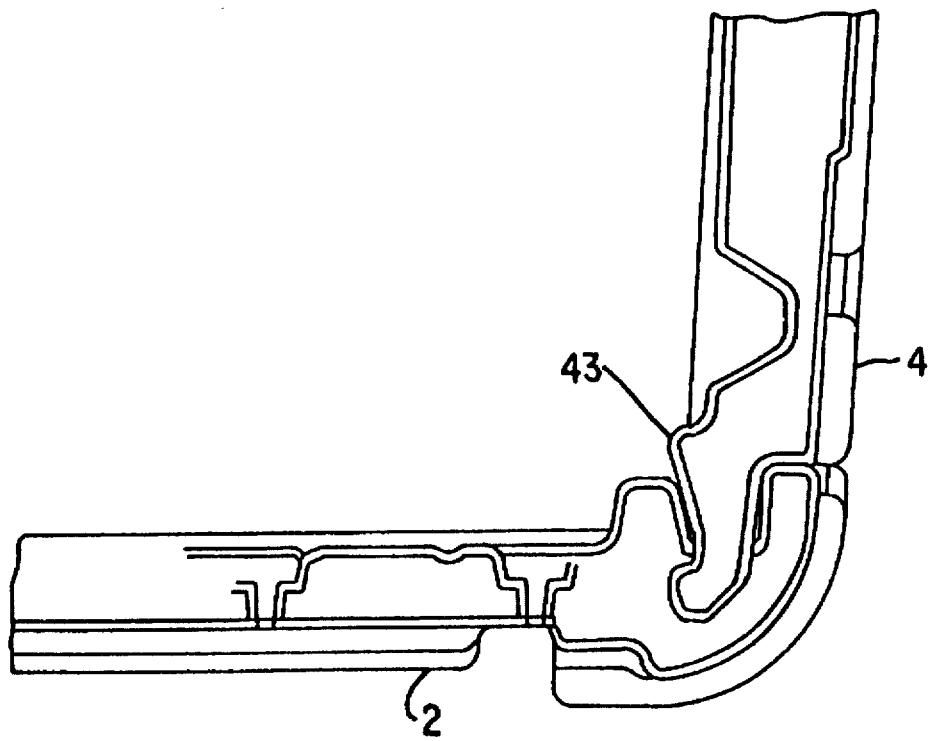
FIG. 9 is a cross-sectional view of the snap detail between the front wall and a side wall.
Figure 10:
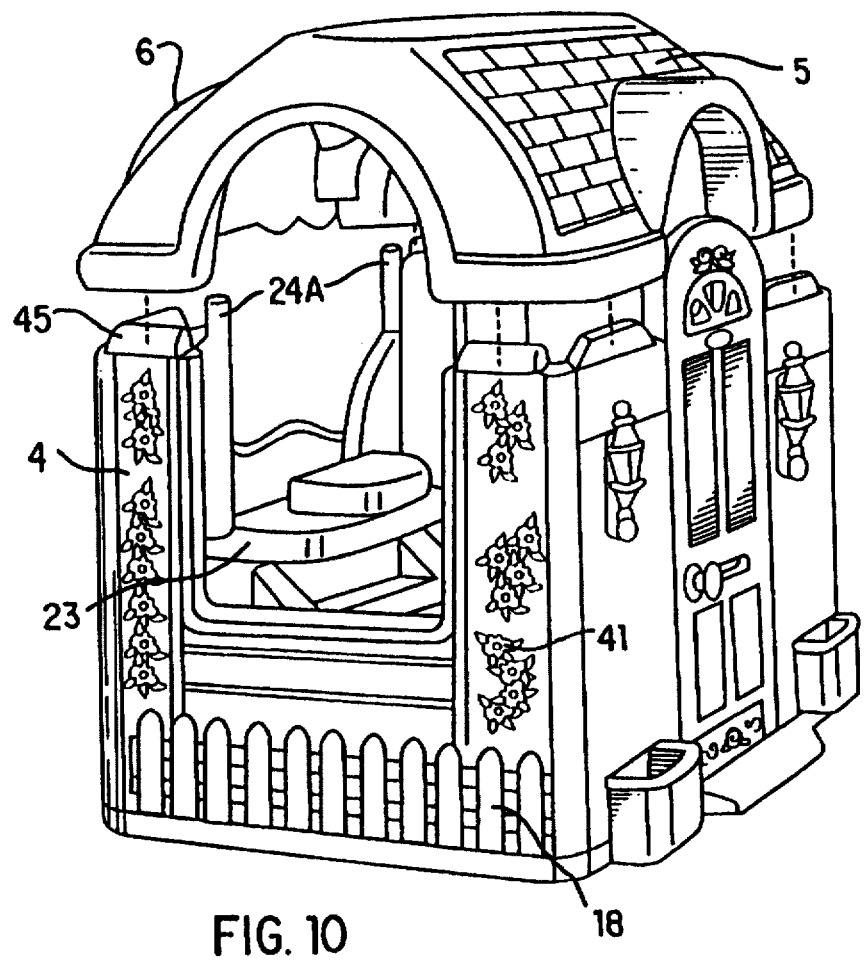
FIG. 10 is a partially exploded perspective view of the playhouse.

Similar to the snap interlock fit the front wall and the rear wall have with the roof, the walls panels are all preferably connected to each other by this same snap interlock system. As depicted in FIG. 9, the snap detail (43) on the side edge of the right side wall panel (4) is fitted into an aperture (44) in the front wall (2). Similar to the wall-roof connection, the snap detail (43) on the wall panel edges is adapted to be inserted into an aperture or hole (44) in one wall of another double-walled, hollow wall panel. Thus, all four walls are connected together with these side snaps that are not visible once connected.

While all the wall panels have snap details on their sides, and only the front and rear walls have snap details on the tongues (45), any combination of these connection systems is contemplated.

Figure 3:
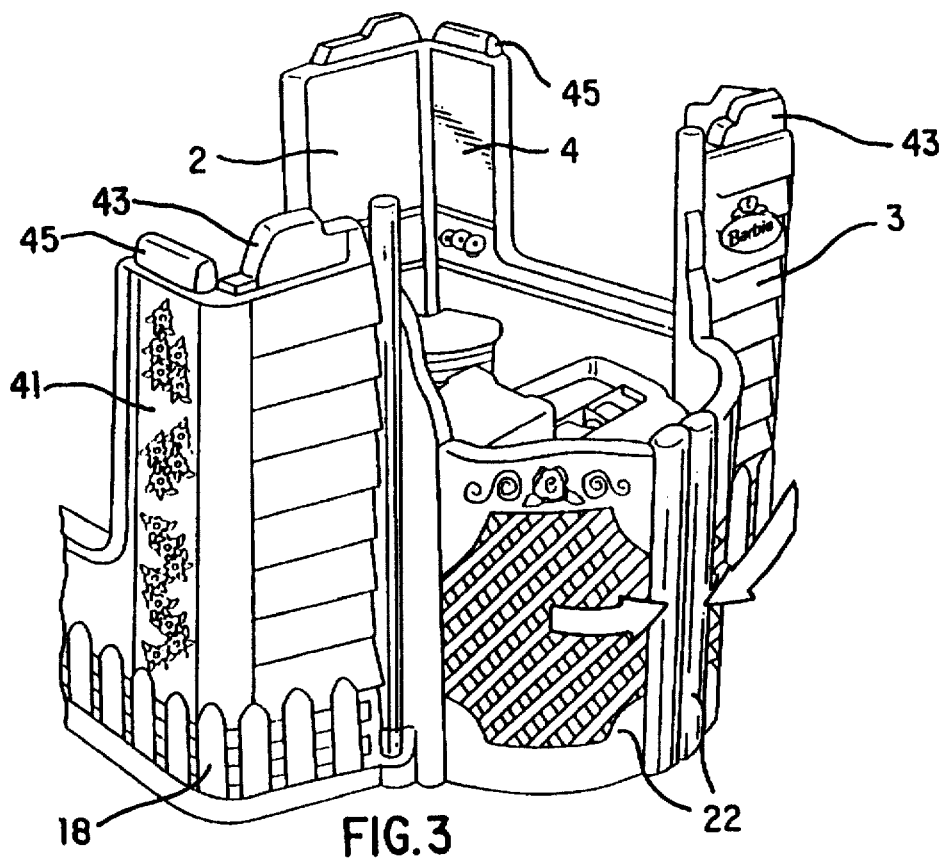
FIG. 3 is a rear perspective view of the playhouse illustrating the swing-out seats in the closed position.
Figure 4:
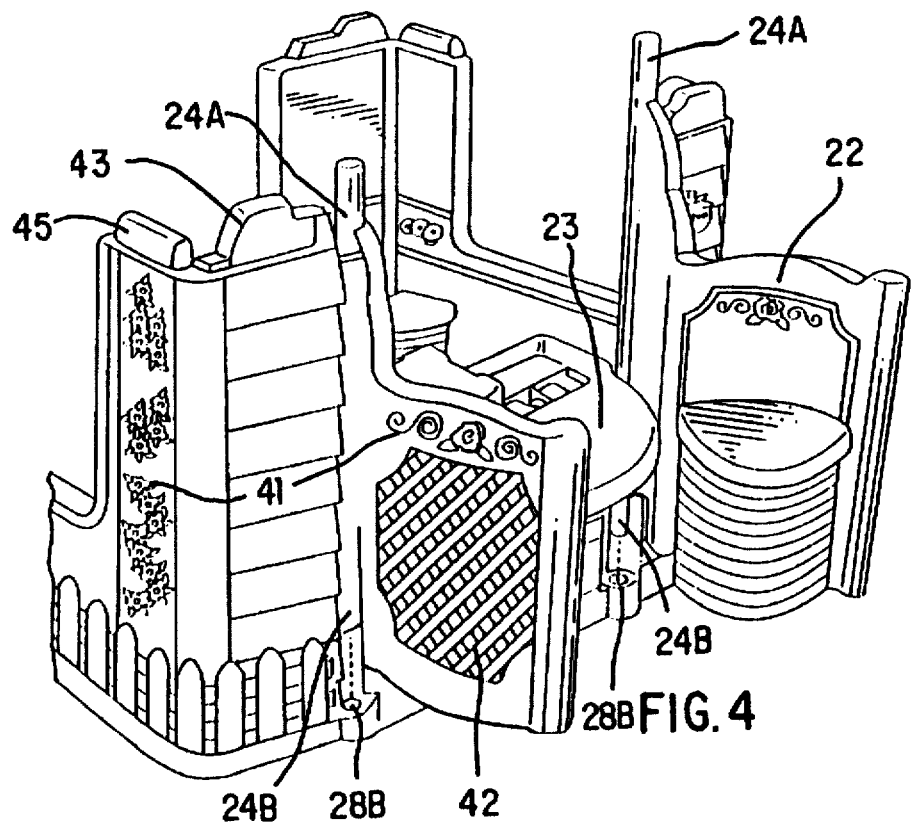
FIG. 4 is a rear perspective view of the playhouse illustrating the swing-out seats in the open position.
Figure 5:
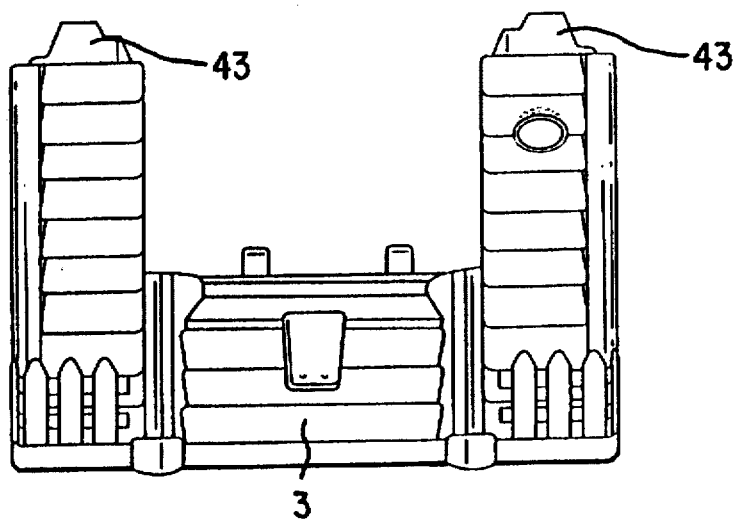
FIG. 5 is a front view of the exterior side of the rear wall.
Figure 6:
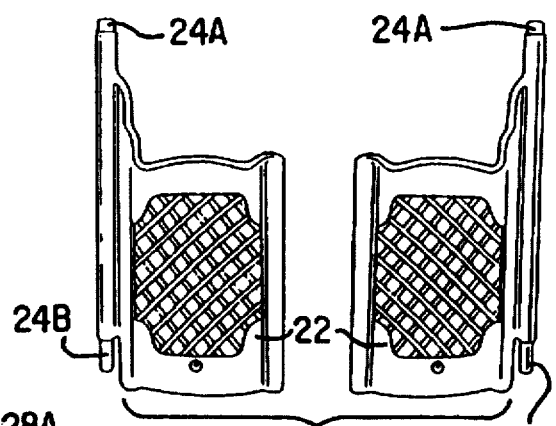
FIG. 6 is a front view of the exterior side of the swing-out seats.
Figure 7:
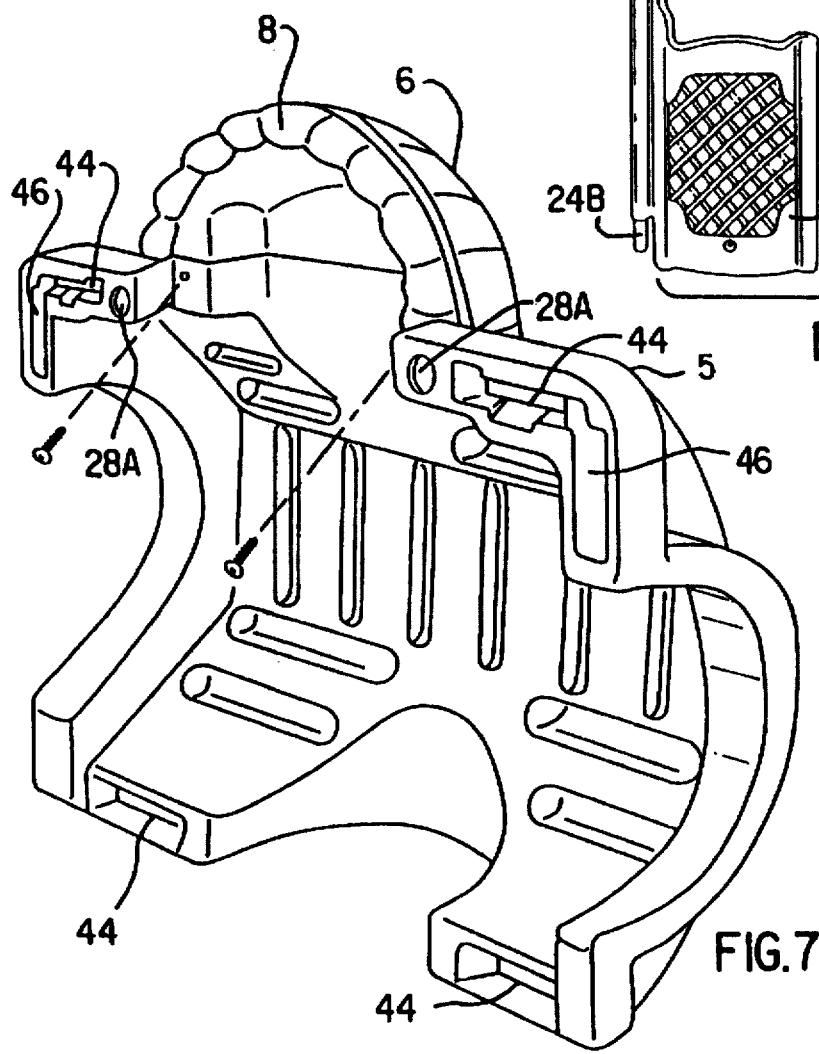
FIG. 7 is a perspective view of the roof of the playhouse.
Figure 8:
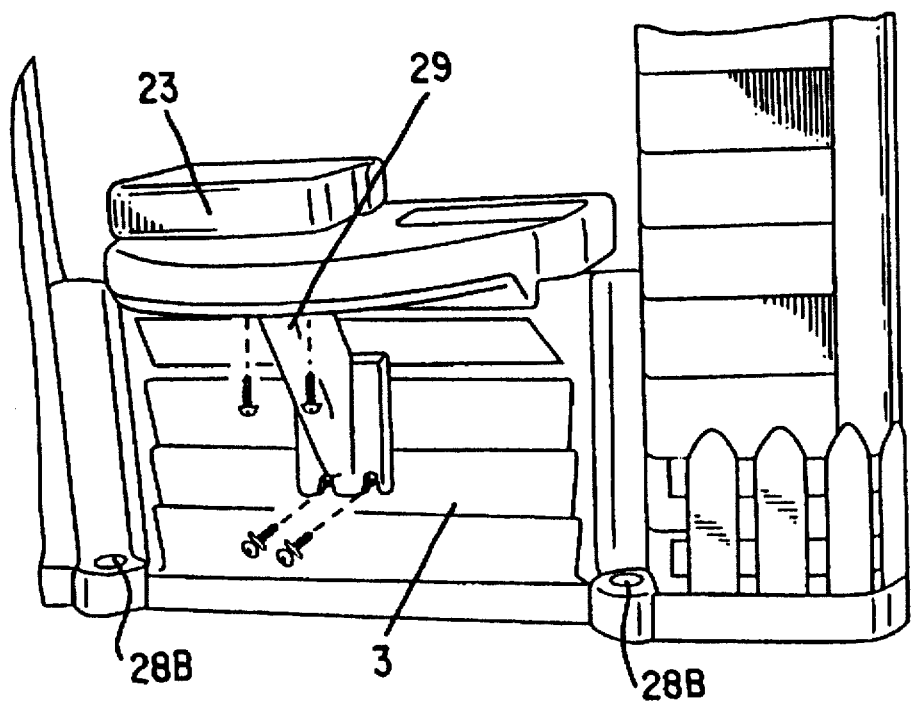
FIG. 8 is a close-up view of the exterior side of the rear wall.
Figure 11:
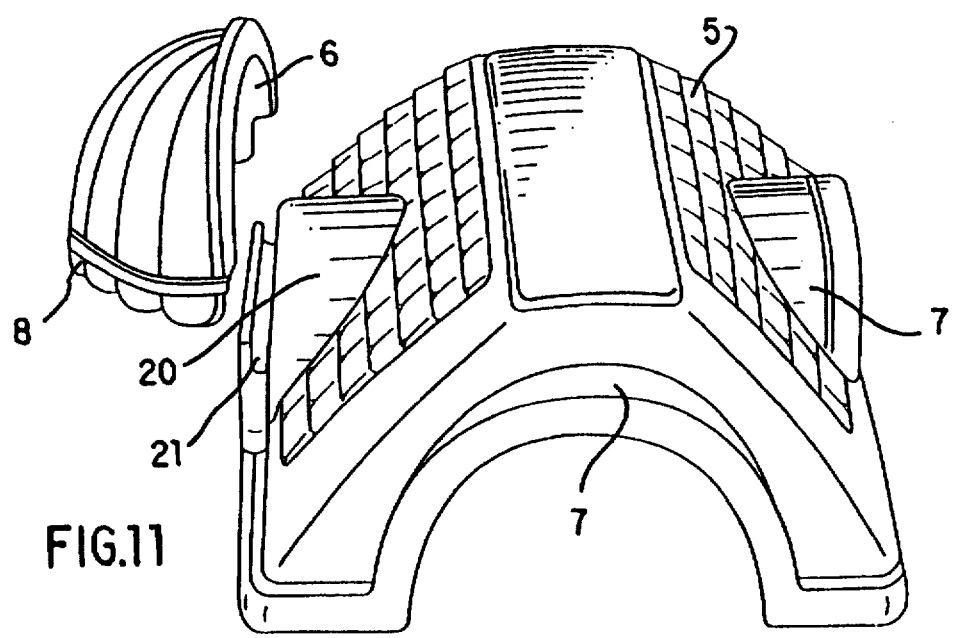
FIG. 11 is an exploded perspective view of the roof assembly.
Figure 12:
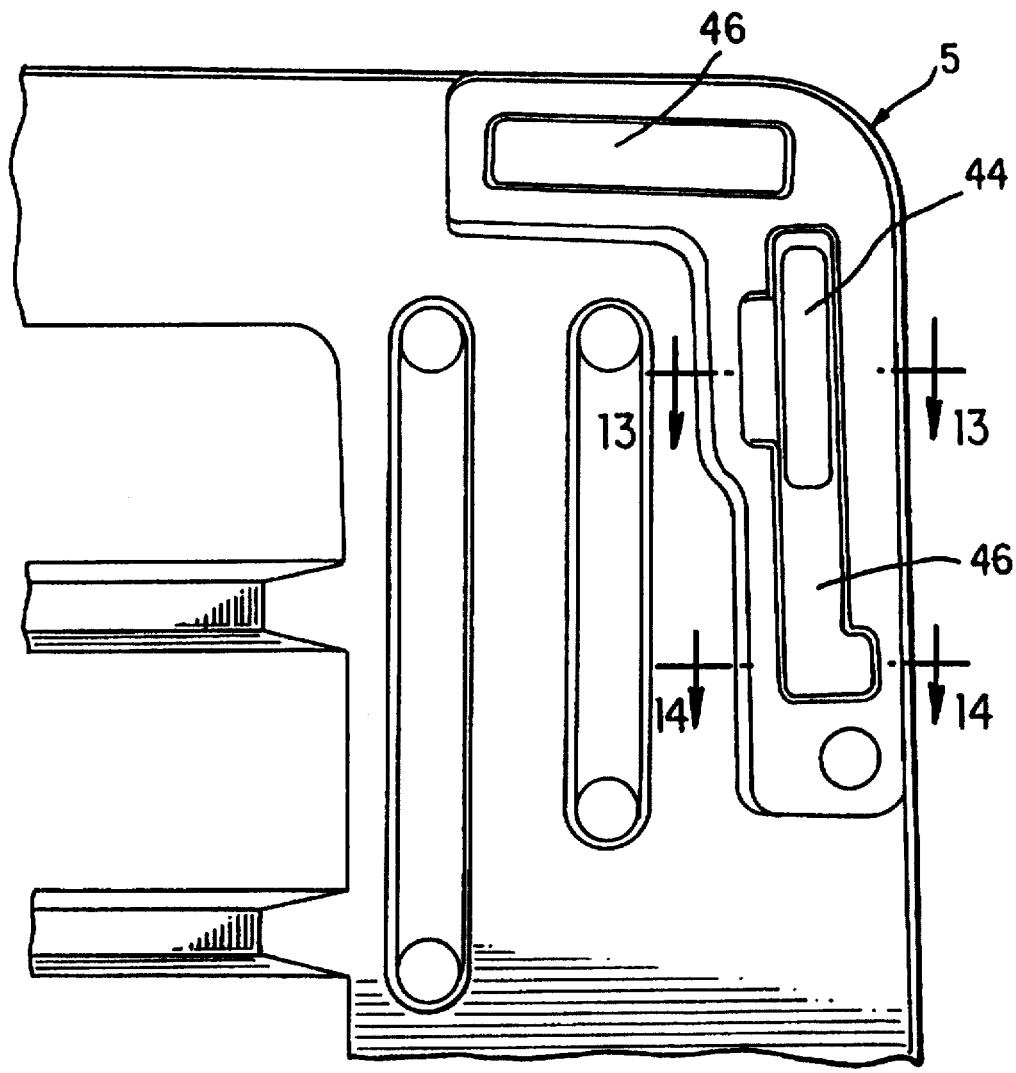
FIG. 12 is a partial view of the bottom surface of the roof.
Figure 13:
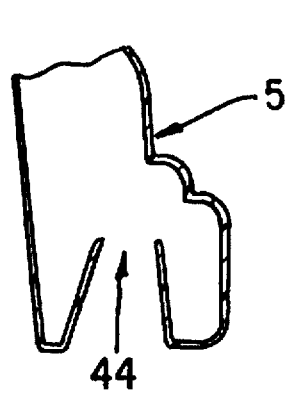
FIG. 13 is a cross-sectional view of the roof in FIG. 12 taken along the F—F line.
Figure 14:
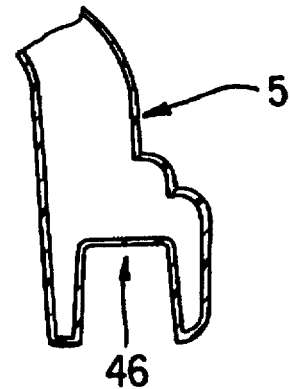
FIG. 14 is a cross-sectional view of the roof of FIG. 12 taken along the G—G line.

As depicted in FIGS. 7 & 11 the roof (5) forms arches (7) which, when assembled, are located over the windows cut-outs (19) on the side walls (see FIGS. 1 and 10) and door (9) on the front wall (see FIG. 2) as well as a back roof arch (20) over the garden party area in the rear. The roof is preferably A-shaped to accommodate larger children, has a realistic shingled appearance, is rotomolded and has molded-in holes (44) which correspond to the snap details along the top edge of the four walls. All of the snap connections on the playhouse are intended for assembly and disassembly by an adult. A rotomolded domed canopy (6) attaches to the back roof arch (20) via a continuous slot (21). The domed canopy (6) preferably has a scalloped valence overhang (8). The roof also has two molded-in holes (28A) which correspond to the upper seat bosses (24A) which are illustrated in FIG. 4. As seen in FIGS. 3 & 4, the rear wall (3) of the playhouse has a pair of attached pivoting or swing-out chairs or seat members (22) that, when closed, form a semi-circle extending off the rear of the rear wall (3) and show lattice work (42) and flower details (41) similar to a trellis. The space between the top of the closed chairs and the domed canopy creates a window opening for the back wall. The chairs (22) pivot open to reveal rose detailed wicker seating for two as well as a garden party table (23) with a molded-in tablecloth and wicker styling.

As shown more clearly in FIG. 4, the pivoting chairs (22) first connect at the bottom drilled holes (28B) located on the rear wall (3) via a continuous molded boss or mounting post on the chairs which runs from the bottom of each chair and (24B) extends upward (24A) into the underside of the roof. The roof assembly thus traps the top bosses (24A) of the pivoting chairs (22) to the molded-in holes in the roof (28A), completing their assembly.

The pivoting action of the chairs (22) has a built-in "float" to compensate for uneven as well as worn away ground surface which may results from the pivoting action itself. This float allows the chairs to travel at least one inch below ground level. As a result, there will be no resulting pinch points at the connections of these pivots or at the points where the chairs (22) opened and close against the house or garden party table (23). The pivoting, hinged chairs or seat members form an extension off the rear wall of the playhouse, and once assembled, are permanent.

As seen in FIG. 2 while the seat member can be any hinged, substantially planar seating surface, the seat members (22) preferably include a substantially vertical back support (25), a substantially horizontal seat portion (26) and a base portion (27). The seat members (22) can pivot about a vertical axis, as in the preferred embodiment, or can pivot about a horizontal axis and can be located anywhere on the interior or exterior surface of the playhouse.

When the playhouse is fully assembled, the pivoting chairs (22) and the table (23) of the preferred embodiment form garden party area where children may sit and play or eat. The table is supported to the rear wall (3) via a table support (29) held in place by screws (see FIG. 8).

As illustrated in FIG. 2, the interior rear wall of the playhouse includes a raised level which consists of a two-burner stove (30) and a removable sink (31) with a pivoting faucet (32) and knobs (33). The faucet (32) and knobs (33) are held in place by a sink retainer (34) disposed beneath the sink. The sink is preferably constructed of rotomolded plastic and is lightly press-fit to the table surface (23). It preferably has recessed handles molded into the sides and should be easily removable when filled with water. It must also pivot off its press-fit when filled so as not to cause an obvious handhold which would facilitate climbing through. The sink faucet (32) and knobs (33) are preferably blow-molded and are consumer snapped into molded-through holes in the sink and should pivot freely in both directions. They should also withstand a load associated with removing and carrying a sink filled with water without disassembly, bending or breaking.

Below the sink (31) and stove (30) are two open shelves (37) for storing dishes and other household items. On the upper wall to the left of the sink is a molded telephone which will accept a telephone receiver (37). The telephone receiver (37) should easily press-fit into the telephone as well as be easily removable by a two year old child. On the upper wall to the right of the sink is a molded-in frame (38) for receiving a calendar or photograph. Any calendar label or other logo art present in or on the playhouse must be able to withstand outdoor conditions, as this playhouse can be used in either an inside or outside environment.

As further detailed in FIGS. 2, 3 & 4, the interior walls of the playhouse may include molded-in seats or corner chairs (36) and table surfaces (40), with or without the wicker and rose trellis detailing. Other appurtenances, such as appliances, decorations and furnishings, are also contemplated.

In the preferred embodiment described above, the playhouse is primarily manufactured using rotomolded low density polyethylene. Other suitable materials and/or molding or manufacturing methods, including blow molding, may be used to manufacture any or all of the components. Also, in the preferred embodiment, the various pieces (i.e., walls, roof, seat members, tables and attached furnishings and appurtenances) are generally of a hollow construction; however, they may be molded or formed as solid parts from any suitable material, including but not limited to plastic, wood or metal. Preferably, all the edges of the playhouse and features therein are rounded to eliminate the risk of cuts and scratches to children using the playhouse. The preferred embodiment of the playhouse also includes realistic siding on all exterior wall surfaces.

What is claimed is:

1. A walk-in child playhouse comprising:
   a plurality of walls coupled to each other to form a peripheral wall structure bounding an interior play area; and
   a seat member pivotally coupled to a first one of said walls for pivotal movement relative to said first one of said walls and about a substantially vertical axis between a first, open position spaced from said first wall and a second, closed position adjacent said first wall.

2. The walk-in child playhouse of claim 1 wherein said seat member comprises a substantially vertical seat back, a substantially horizontal seat bottom, a lower base portion, and a substantially vertical mounting post, said seat member being coupled to said first wall by said mounting post.

3. The walk-in child playhouse of claim 2 further comprising a roof, wherein said walls are substantially vertically disposed and have a top surface adapted to securably connect to said roof and wherein said mounting post has an upper mounting portion at an upper end thereof, said upper mounting portion engaging said roof, and a lower mounting portion at a lower end thereof, said lower mounting portion engaging said first wall.

4. The walk-in child playhouse of claim 1 further comprising:
   a door opening in a second one of said walls providing entry and exit from said interior play area; and
   a door movably mounted in said door opening.

5. The walk-in child playhouse of claim 1 further comprising a second seat member coupled to said first wall for pivotal movement about a substantially vertical axis between a first, open position spaced from said first wall and a second, closed position adjacent said first wall, said second seat member and said first seat member being arranged symmetrically on said first wall.

6. The walk-in child playhouse of claim 5 wherein said first and second seat members contact each other along a vertical plane when in said closed position.

7. The walk-in child playhouse of claim 6 wherein each of said first and second seat members has an interior surface and an exterior surface, said exterior surface being substantially arcuate, and wherein said arcuate exterior surfaces form a continuous arcuate surface when said seat members are in said closed position.

8. An enclosed play apparatus comprising:
   a plurality of walls coupled to each other to form a peripheral wall structure bounding an interior play area;
   a roof connected to said walls;
   a door pivotally connected to one of said walls for entry and exit into said play area; and
   at least one seat member having a substantially horizontal seating surface, said seat member being pivotally connected to at least one wall such that said seat member is pivotable relative to said at least one wall.

9. The enclosed play apparatus of claim 8 wherein said at least one seat comprises a pair of seat members and said plurality of walls comprise a from wall having said door hingedly mounted thereto, a rear wall having said pair of seat members hingedly mounted thereto, and a pair of side walls connectable to said front and rear walls, wherein said seat members pivot from an open position having an exposed seating surface to a closed position.

10. A walk-in child playhouse comprising:
    a pair of front wall panels connected by a lateral connecting member on a lower end thereof and a roof on an upper end thereof, said wall panels, roof and lateral connecting member defining therebetween a door opening, said lateral connecting member having a first door connection point and said roof having a second door connection point; and
    a door pivotally mounted in said door opening to said first and second door connection points.

11. The walk-in child playhouse of claim 10 wherein connection between said door and each of said roof and lateral connecting member at said door connection points comprises a post and socket mechanism.

12. The walk-in child playhouse of claim 11 wherein said each of said roof and said lateral connecting member comprise a socket adapted to receive a door having coupled thereto a post of complementary size and shape and wherein said post is pivotable about a vertical axis.

13. A structure having interconnecting, flexible, double-walled hollow parts comprising:
    a first hollow member having a first, flexible wall and a second, flexible wall in a spaced relationship to said first wall to define an interior, said first wall having an interior side, an exterior side and an aperture extending through said first wall, said aperture including a first open end on said interior side and a second open end on said exterior side, and a second hollow member to be joined to said first hollow member and having a projection coupled thereto, said projection having a first portion proximate to said second member and sized smaller than said aperture and a second portion distal to said second member sized larger than said aperture, said projection being adapted to be inserted into said aperture of said first hollow member, wherein said second portion is insertable through said aperture to be substantially disposed in said interior and said first portion is adapted to extend through said aperture, said aperture being sufficiently deformable to allow said second portion of said projection to pass through and return to its original size.

14. A walk-in child playhouse comprising:

a plurality of walls coupled to each other to form a peripheral wall structure bounding an interior play area; and a seat member including a substantially vertical mounting post coupled to a first one of said walls for pivotal movement about a substantially vertical axis between a first, open position spaced from said first wall and a second, closed position adjacent said first wall, wherein said seat member includes a substantially vertical seat back, a substantially horizontal seat bottom, and a lower base portion.

15. A walk-in child playhouse comprising:

a plurality of walls coupled to each other to form a peripheral wall structure bounding an interior play area;

a seat member coupled to a first one of said walls for pivotal movement about a substantially vertical axis between a first, open position spaced from said first wall and a second, closed position adjacent said first wall; and a second seat member coupled to said first wall for pivotal movement about a substantially vertical axis between a first, open position spaced from said first wall and a second, closed position adjacent said first wall, said second seat member and said first seat member being arranged symmetrically on said first wall.

* * * * *